Dec. 29, 1931.　　　S. G. GASSAWAY　　　1,838,386
SPECIAL DESIGN ELECTRODE
Filed Sept. 1, 1927　　2 Sheets-Sheet 1

INVENTOR:
STEPHEN G. GASSAWAY,
BY
Ford W. Harris
ATTORNEY.

Dec. 29, 1931.   S. G. GASSAWAY   1,838,386
SPECIAL DESIGN ELECTRODE
Filed Sept. 1, 1927   2 Sheets-Sheet 2
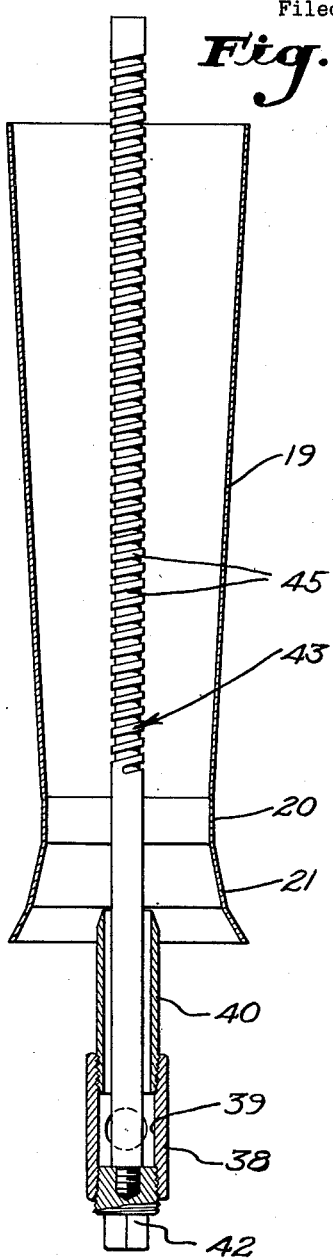
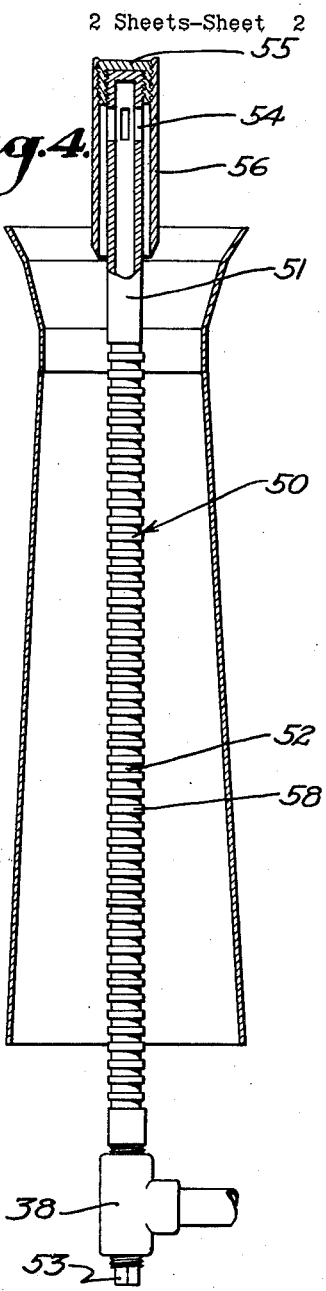
INVENTOR:
STEPHEN G. GASSAWAY,
BY
ATTORNEY.

Patented Dec. 29, 1931

1,838,386

UNITED STATES PATENT OFFICE

STEPHEN G. GASSAWAY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

SPECIAL DESIGN ELECTRODE

Application filed September 1, 1927. Serial No. 216,864.

My invention relates to the electric treatment of fluids and more particularly to such treatment for removing suspended matter from a fluid.

In the petroleum producing industry the crude oil pumped from wells often has foreign solid matter and liquids suspended in the oil so as to form a mixture or emulsion. It is necessary to separate the suspended matter comprising the dispersed phase from the pure oil comprising the continuous phase of the emulsion, in order for the oil to be marketable. Many methods have been devised to accomplish this separation which methods include the submission of the emulsion to the action of physical or chemical agents or to electric treatment. In the methods of electrically treating the mixture or emulsion, a high potential electric field is set up between two electrodes and the emulsion or mixture is passed through this field. This field causes an agglomeration of the suspended matter into large masses so that the oil may be easily separated from the mixture in a settling tank.

Quite a few advantages have been found to proceed from employing a concentrated field. This may be produced by placing one electrode having a small surface area in a central position relative to another electrode having a relatively large surface area. A treater constructed in this manner has not been entirely successful, however, owing to the formation of scale on the smaller central electrode. In spite of all previous efforts for overcoming this fault, scale has formed on the smaller electrode, after operation of the treater for a short time, which is 1/64 inch thick and which, upon test, shows a dielectric strength in excess of 300 volts. In some treaters which were continued in service without removing this scale, the scale increased in thickness and dielectric strength until the oil would not be cleaned to commercial requirements.

It is an object of my invention to provide a method of and apparatus for treating a fluid in an electric field in which the formation of scale on an electrode is prevented.

Further objects and advantages will be made manifest in the following description and accompanying drawings in which a preferred form of the apparatus of my invention is illustrated.

In the drawings,—

Fig. 3 is a detailed sectional view taken on the line 3—3 of Fig. 1, and illustrating a preferred form of central electrode of the apparatus shown in Fig. 1.

Fig. 4 is a view similar to Fig. 3, illustrating a modified form of central electrode.

Figure 1:
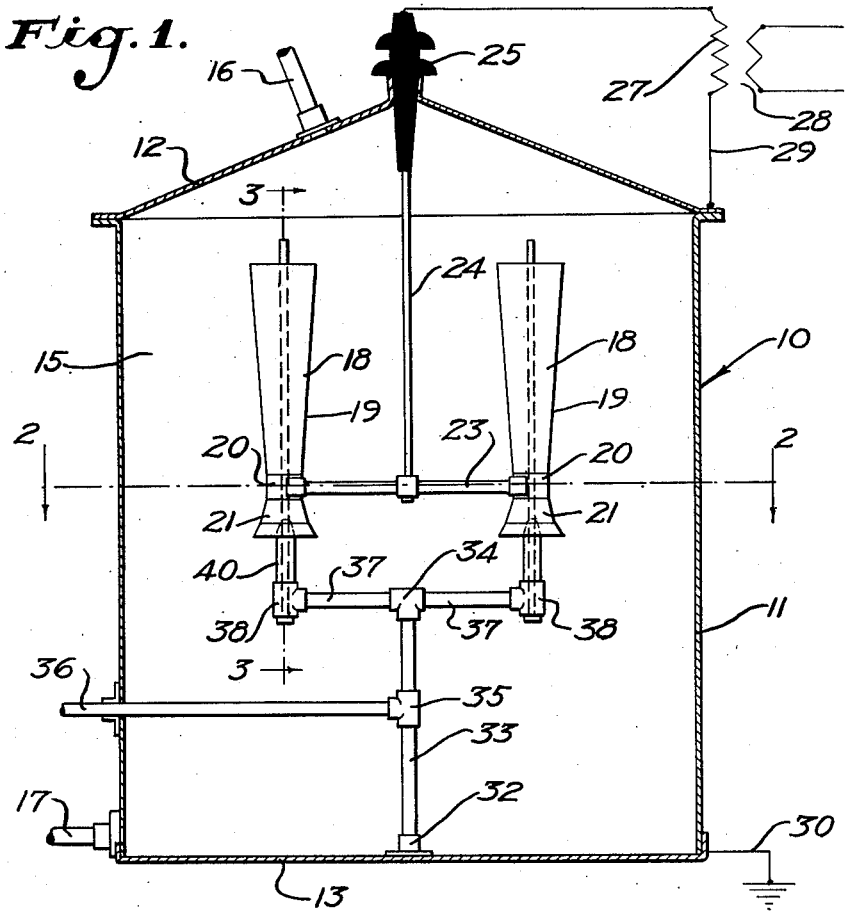
Fig. 1 is a vertical sectional view diagrammatically illustrating the apparatus of my invention.
Figure 2:
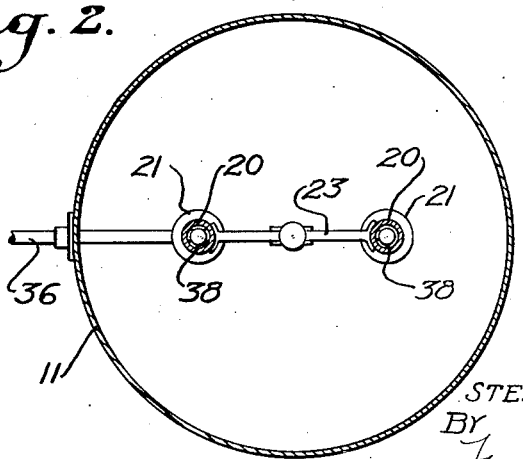
Fig. 2 is a horizontal sectional view taken on the line 2—2 of Fig. 1.

Referring to Fig. 1 of the drawings, the apparatus of my invention comprises generally a fluid treater 10, which includes a cylindrical shell 11, the upper and lower ends of which are tightly closed by a cover plate 12 and a bottom plate 13 respectively, so as to form a treating chamber 15 within the shell 11. Connected with the cover plate 12 so as to lead from the upper end of the chamber 15 is a fluid outlet pipe 16. Connected with the shell 11 so as to lead from the lower end of the chamber 15 is a fluid outlet pipe 17. Disposed in the chamber 15 is a pair of electrodes 18 which includes downward tapering portions 19, a neck 20, and an outward flaring lower portion 21. Rigidly connecting with the neck 20 of the electrode 18 at its opposite ends is a cross-bar 23 which centrally connects with a conductor rod 24 which extends upward through an insulator 25 tightly fitting centrally into the cover plate 12. Outside of the treater 10, the conductor 24 connects with one end of a secondary 27 of a transformer 28. The other end of the secondary 27 is grounded to the shell 11 as by a conductor 29. If desired, the shell 11 may also be grounded to the earth as by a conductor 30.

Mounted upon the bottom plate 13 within the chamber 15 is a bracket 32 which tightly and rigidly closes and supports a hollow standard 33 which is formed of pipe. At its upper end the standard 33 is provided with a T-fitting 34 and intermediate of its ends it is fitted with a T-fitting 35. Extending through the shell 11 and connecting with the T-fitting 35 is a fluid inlet pipe 36. Branching in opposite directions from and rigidly supported upon the T-fitting 34 are lateral pipes 37 which are provided with T-fittings 38 which are rigidly mounted on the lateral pipes 37 so that the major opening 39 of each of the T-fittings 38 is vertically disposed in alignment with one of the electrodes 18.

Referring specifically to Fig. 3, a short flow nipple 40 is screwed into the upper end of each of the T-fittings 38 so that the upper end of each nipple 40 projects a slight distance into the lower portion 21 of the electrode 18 disposed thereabove. Screwed upward into the lower end of the opening 39 of each T-fitting 38 is a plug 42, upon the upper end of which is rigidly mounted a central electrode rod 43 so that this rod extends upward axially through the nipple 40 and the electrode 18 disposed thereabove. The outer surface of the rod 43 is provided with shallow formations 45 which, in the present instance, are in the form of a screw thread so as to provide a helical channel separated by a helical ledge.

The operation of the treater 10 in carrying out the method of my invention in the treatment of petroleum emulsions for separating suspended matter therefrom is as follows:

The chamber 15 is first filled with dielectric fluid such as oil of the same quality as that contained in the emulsion. The transformer 28 is now energized so as to set up a field of high potential between each electrode 18 and its associated central electrode 43. The petroleum to be treated is now supplied to the treater through the pipe 36 so that this petroleum is projected upward from the upper end of the nipples 40. This causes the emulsion to flow upward along the outer surface of each central electrode 43 through the highly concentrated portion of the electric field set up between the electrodes 18 and 43. The threads 45 are fairly minute in size but yet these threads cause sufficient turbulence in the fluid passing upward along the electrode 43 to prevent the adhering of any substance carried by this fluid to the outer surface of the electrode 43, and the maximum potential gradient set up by the threads 45, thus effectively prevent the formation of scale on the electrodes 43.

In Fig. 4, I have shown a modified form of central electrode 50 adapted to be used in the treater 10. The electrode 50 comprises a tube 51 having a series of thread-like annular channels 52 formed in the outer surface thereof substantially throughout its length. The lower end of each of the tubes 51 is threadedly received in the upper end of each of the openings 39 of one of the T-fittings 38. The lower end of the opening is closed by an ordinary plug 53. The upper end of the tube 51 is externally threaded and has lateral openings 54 formed therein. An internally and externally threaded cap 55 is screwed over the upper end of each tube 51, and threadedly received on this cap so as to extend downward around the upper end of the tube 51 is a tubular jet member 56.

The operation of the electrode 50 is very similar to that of the electrode 43 except that the fluid to be treated passes upward through the tube 51 and is discharged through the opening 54 and downward from the mouth of the jet member 56 around the electrode 50. The annular channels 52 formed in the outer surface of the electrode 50 are divided by annular ridges 58 which act in substantially the same manner upon the fluid to be treated as the thread 45 provided on the electrode 43.

The invention herein shown and claimed is an improvement on the electrode system shown in a copending application of Harmon F. Fisher, Serial No. 135,804, which application broadly claims this general type of electrode structure and fluid-directing means, the present application being directed to a method and apparatus for setting up a sufficient turbulence in the flow along the electrode to prevent the formation of scale thereon.

I claim as my invention:

1. A method of preventing the formation of scale on an electrode surface when electrically treating a fluid to remove suspended matter therefrom which consists in setting up between a pair of electrodes an electric field which is relatively concentrated adjacent one of said electrodes, flowing said fluid in the form of a stream along the surface of said one of said electrodes but not bridging the gap between said electrodes, and setting up a relatively minute turbulence in said stream of fluid flowing along the surface of said one of said electrodes and in said concentrated portion of said field, said turbulence being of only sufficient magnitude to prevent the formation of scale on the surface of said one of said electrodes and not of sufficient magnitude to move said emulsion away from the vicinity of the electrode surface.

2. In an apparatus for treating a fluid to remove suspended matter therefrom, the combination of; an electrode having a relatively small surface; an electrode having a relatively large surface; means for setting up an electric field between said electrodes; means for introducing a fluid to be treated into said field in a fluid envelope contacting only said electrode of small surface; and relatively minute formations on said electrode of small surface for causing a turbulence in said fluid adjacent thereto and preventing the formation of scale on said electrode of small surface.

3. A method of preventing the formation of scale on an electrode surface when electrically treating a fluid to remove suspended matter therefrom which consists in setting up between a plurality of electrodes an electric field passing a fluid to be treated through said field, and setting up a sufficient turbulence in said fluid adjacent a surface of one of said electrodes to prevent the formation of scale thereon.

4. In an apparatus for dehydrating a petroleum emulsion, the combination of: a central electrode; a surrounding electrode around said central electrode but spaced therefrom to provide an annular treating space open at its ends; means for building up an electric field between said electrodes; a nozzle flowing an annular stream of said emulsion along and in contact with the surface of said central electrode said annular stream surrounding said central electrode but being of insufficient width to bridge the space between said electrodes; and minute thread-like formations formed on the surface of said central electrode and extending substantially transversely with respect to the direction of movement of said annular stream, said formations being too small to force said annular stream from said surface of said central electrode, but being large enough to set up a turbulence in said annular stream sufficient to decrease the formation of scale on the surface of said central electrode.

In testimony whereof, I have hereunto set my hand at Los Angeles, California, this 26th day of August, 1927.

STEPHEN G. GASSAWAY.